(12) United States Patent
Gratzer

(10) Patent No.: US 7,367,436 B2
(45) Date of Patent: May 6, 2008

(54) MOTOR VEHICLE EQUIPPED WITH A BRAKE SYSTEM AND WITH A DRIVE SYSTEM

(75) Inventor: Franz Gratzer, Stallhofen (AT)

(73) Assignee: Magna Powertrain AG & Co KG, Lannach (AT)

( * ) Notice: Subject to any disclaimer, the term of this patent is extended or adjusted under 35 U.S.C. 154(b) by 251 days.

(21) Appl. No.: 10/511,228

(22) PCT Filed: Apr. 11, 2003

(86) PCT No.: PCT/AT03/00107

§ 371 (c)(1),
(2), (4) Date: May 23, 2005

(87) PCT Pub. No.: WO03/086831

PCT Pub. Date: Oct. 23, 2003

(65) Prior Publication Data

US 2005/0236207 A1    Oct. 27, 2005

(30) Foreign Application Priority Data

Apr. 12, 2002    (AT)    .............................. GM230/2002

(51) Int. Cl.
*B60W 10/02* (2006.01)
*B60W 10/18* (2006.01)
*B60K 23/08* (2006.01)

(52) U.S. Cl. ................................... 192/13 R; 192/221
(58) Field of Classification Search ..................... None
See application file for complete search history.

(56) References Cited

U.S. PATENT DOCUMENTS 6,005,358 A * 12/1999 Radev ......................... 318/139

* cited by examiner

*Primary Examiner*—Richard M Lorence
(74) *Attorney, Agent, or Firm*—Harness, Dickey & Pierce, P.L.C.

(57) ABSTRACT

In a motor vehicle having a brake system and a drive train, the brake system comprises a vehicle movement dynamics controller (10), a control group (40) for actuating brakes and a hydraulic unit with pressure medium supply (25, 27, 30) and wheel-specific hydraulic valves ($43_{LV}$, $43_{RV}$, $43_{LH}$, $43_{RH}$) for activating the individual wheel brake cylinders ($12_{LV}$, $12_{RV}$, $12_{LH}$, $12_{RH}$), and the drive system has at least one drive train (2, 3; 5, 7, 8) in which a controllable clutch (6) is arranged, which clutch (6) is activated by a clutch actuation means ($40_K$), a hydraulic valve ($43_K$) and an actuator (16) In order to make the vehicle as a whole cheaper but also bring about a functional improvement, the clutch controller of the drive system is integrated into the vehicle movement dynamics controller (10) of the brake system, and the hydraulic valve ($43_K$) for activating the clutch (6) is connected to the pressure medium supply (25, 27, 30) of the brake system, and the modular control group 11.

20 Claims, 2 Drawing Sheets

MOTOR VEHICLE EQUIPPED WITH A BRAKE SYSTEM AND WITH A DRIVE SYSTEM

BACKGROUND OF THE INVENTION

The invention relates to a motor vehicle having a brake system and a drive system, wherein the brake system is composed of: a vehicle movement dynamics controller, an electronic control group for wheel-specific actuation of brakes and a hydraulic unit with pressure medium supply and wheel-specific hydraulic valves, combined to form one assembly, for activating the individual wheel brake cylinders, and wherein the drive system has at least one drive train which has the purpose of driving the wheels and in which a controllable clutch is arranged, which clutch is activated by a clutch controller as a function of operating variables using a clutch actuation means and a hydraulic valve for acting on its hydraulic actuator.

Brake systems with wheel-specific hydraulic valves for activating the individual wheel brake cylinders are a recent development and are particularly suitable for applying modern driving aids such as ABS (anti-lock brake controller), ETC (electronic traction control) and ESP (electronic stability program). They may be, for example, electrohydraulic brake systems (often referred to in specialist literature in abbreviated form as "EHB"), such as is described, for example, in DE 199 23 689 A1.

The drive system may comprise one or more drive trains, corresponding to a vehicle with one or more driven axles. In the first case, the controllable clutch has the purpose of locking the axle differential which is continuously variable in accordance with the requirements of vehicle movement dynamics. In the second case, it can be used for connecting the further driven axle or locking a central differential mechanism (also referred to as inter-axle differential) in a continuously variable fashion, or for controlling the distribution of torque between the two axles.

In the drive systems of this type mentioned above, the clutch, or the clutches, each have a separate functional group with a separate power source and a separate control device which retrieves the operating data of the vehicle from a bus (this is usually a CAN bus) and calculates the necessary clutch position from said data and then correspondingly actuates the clutch. Most of this operating data together with other data, including that from the vehicle movement dynamics controller of the brake system, is used and therefore obtained from the same bus.

Furthermore, in many situations the brake system must be matched to the clutch control. This means that two separate systems have to communicate with one another, the data between the two controllers, which are usually programmed processors, being connected and exchanged via interfaces, coding/decoding means and the bus. This is a source of errors and also requires time which is always critical in vehicle movement dynamics control operations. Furthermore, the expenditure on control and activation is considerable, both in logistical terms and also because the safety requirements which are made of the clutch control require a minimum level of expenditure which exceeds the scope of pure control functions, which is small in itself.

Although DE 37 21 626 discloses a motor vehicle with first-generation four-wheel drive in which the master brake cylinder of a brake device acts on the wheel brakes of the wheels and also the actuating element of a clutch is activated, the brake device is purely hydraulic and therefore does not have any electronically actuated, wheel-specific hydraulic valves. The clutch is only used to disconnect the drive connection during braking and cannot be actuated in a variable fashion.

It is therefore the object of the invention to make the vehicle as a whole cheaper while at the same time improving it functionally.

SUMMARY OF THE INVENTION

The foregoing object is achieved according to the invention, wherein the clutch controller of the drive system is integrated into the vehicle movement dynamics controller of the brake system, and the hydraulic valve for activating the clutch is connected to the pressure medium supply of the brake system and is part of the hydraulic valve assembly.

As a result, not only are two times two similar systems combined to form only one system in each case, but also the communication between the two controllers is exported into the program of the now single controller, as it were internalized, as a result of which a source of errors is eliminated and time is gained. In practical terms, this means that, when the invention is implemented on the hardware of the vehicle movement dynamics controller, no changes at all are necessary and it is sufficient to adapt the program, usually only in a few details. This also satisfies the stringent safety requirements for the control of the brake system.

The common pressure medium supply of the brake system and clutch initially allows the system to be made considerably cheaper because a pump together with drive, valves and lines is eliminated. Electrohydraulic brake systems have a high-pressure accumulator in all cases so that sufficient pressure medium is available even when there is synchronism. In addition, there is the fact that the actuators are the same in terms of force and displacement, which is an advantage for the supply by means of only one power source. Electrohydraulic brake systems thus make it possible to overcome the prejudice that a brake system has to be independent in terms of safety. As a result of the fact that the hydraulic valve for the clutch is also part of this assembly, the degree of integration of the two systems is increased, usually even entirely without additional expenditure if the modular valve blocks which are used as an assembly contain a reserve unit ("virtual fifth wheel"). The valves and lines which are used for brake systems satisfy the most stringent safety requirements and also satisfy the requirements of the clutch control even more easily.

In a completed development, the clutch actuation means is also integrated into the electronic control group. This is usually also of modular design and is composed of the drivers which convert the signals coming from the vehicle movement dynamics controller into control current for the control valves. Here too, use is made of the modularity of this assembly.

The invention is described and explained below with reference to illustrations, in which:

DETAILED DESCRIPTION

Figure 1:
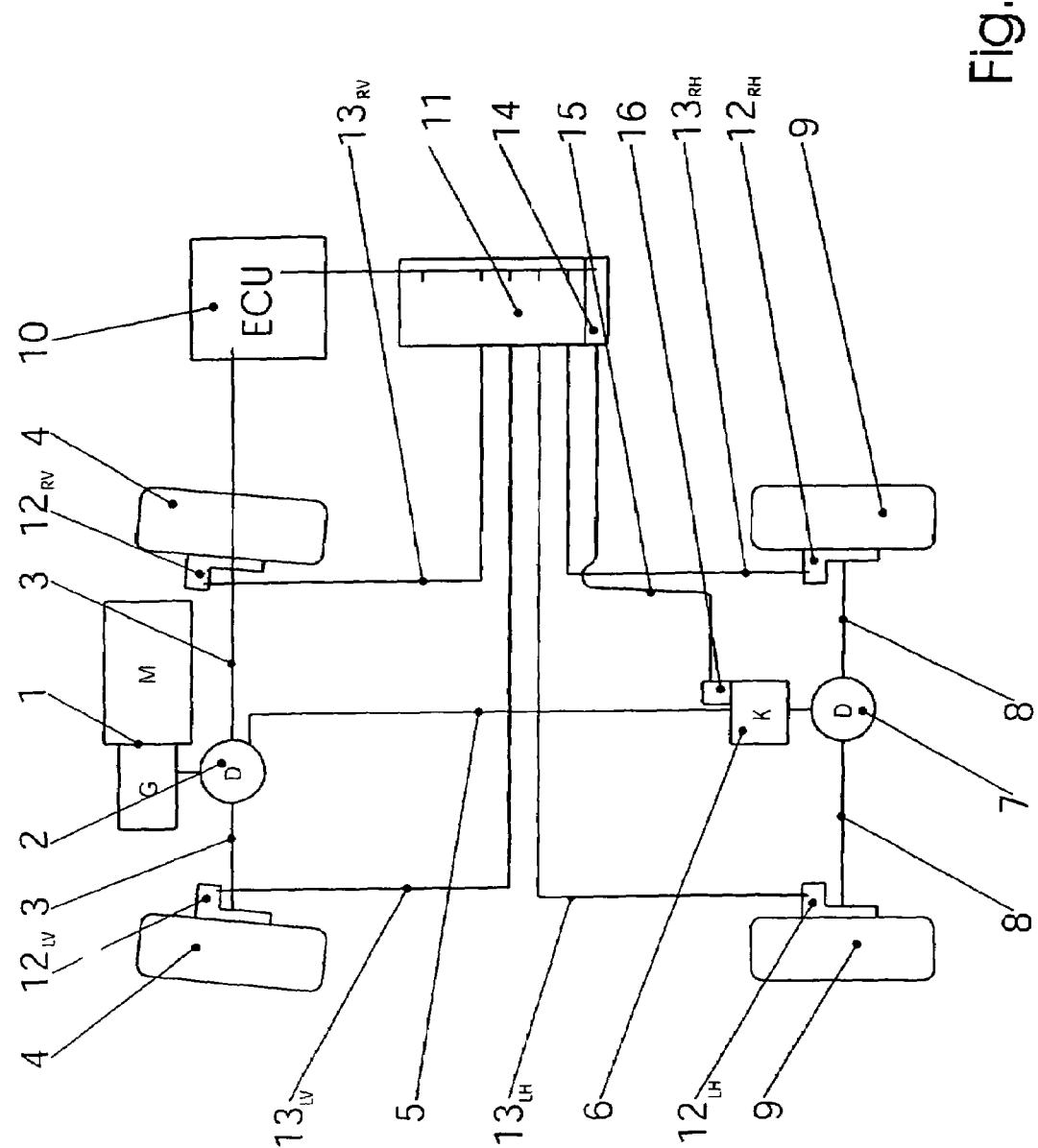
FIG. 1 is a rough outline of the invention.

FIG. 1 illustrates, for example, a vehicle with an engine transmission block 1 arranged transversely at the front.

However, this is irrelevant to the invention and the invention can pretty well be applied with any other configuration of the drive mechanism. The engine transmission block 1 is connected to the wheels 4 of the front axle via a front axle differential mechanism 2 and the half shafts 3. This connection forms a first very short drive train. A Cardan shaft 5 leads from the front axle differential mechanism 2 via a clutch 6, a rear axle differential mechanism 7 and rear half shafts 8 to the wheels 9. This constitutes a second drive train. The controllable clutch 6 which is contained in the second drive train has the purpose of controlling the distribution of torque between the front axle and the rear axle. The drive force could equally well be distributed from the engine transmission block 1 via a central differential mechanism (not illustrated) to the two axle differential mechanisms 2, 7. In this case, the controllable clutch would be an adjustable differential lock.

The brake system is composed of a vehicle movement dynamics controller 10, a control group, designated here in its entirety by 11, with valves (not illustrated), from which wheel brake cylinders 12 (also indicated) are activated via brake lines 13 (provided with indices in the figure). The clutch actuation means 14 is indicated here as an attachment of the control group 11, a pressure line 15 leading from it to the actuator 16 of the clutch 6.

Figure 2:
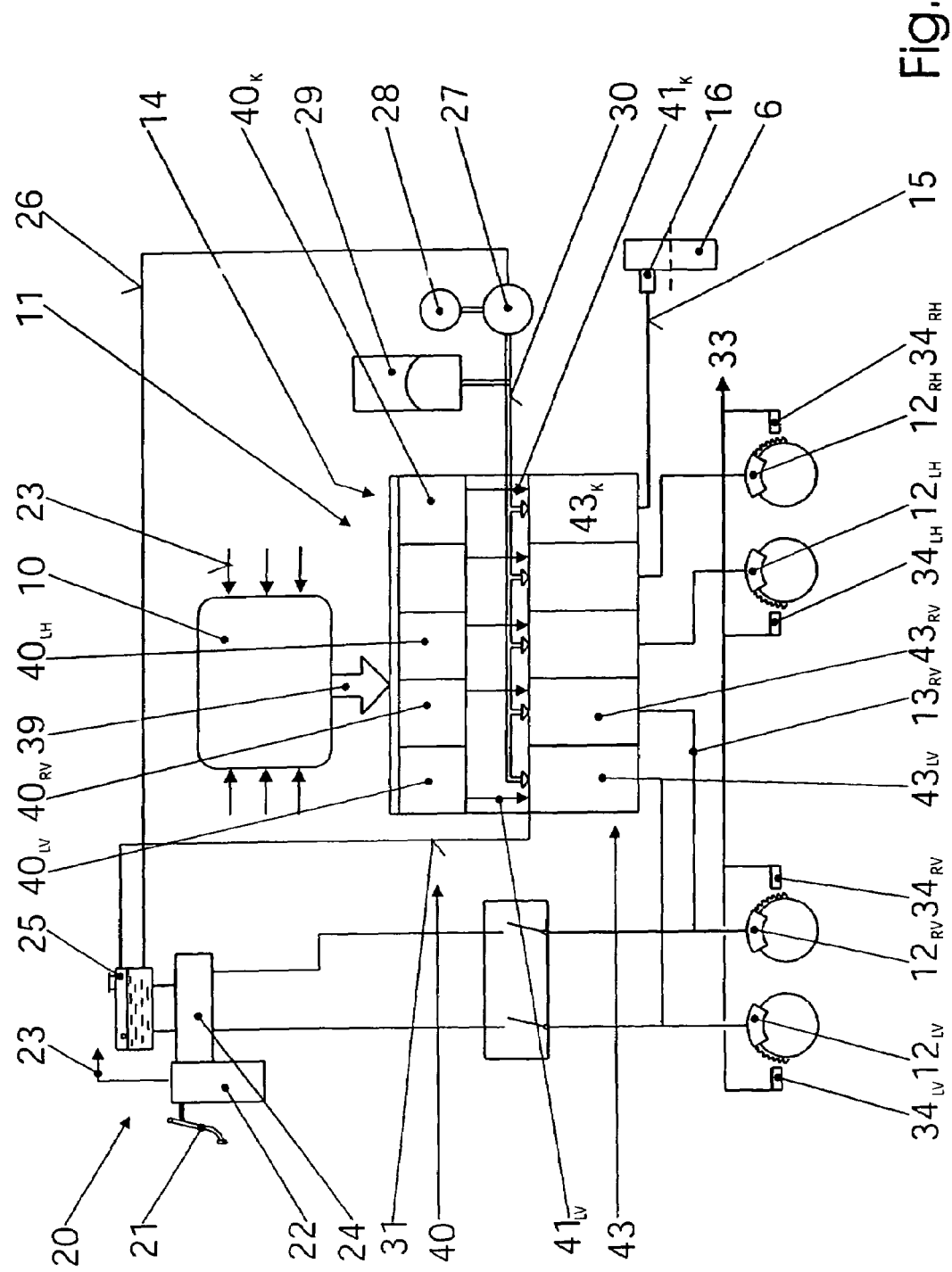
FIG. 2 is a schematic view of an electrohydraulic brake system having the system which is integrated according to the invention.

FIG. 2 illustrates in somewhat more detail the brake system which is combined with the clutch control in the embodiment with the maximum degree of integration. An activation unit which is designated in its entirety by 20 is composed of a brake pedal 21, a brake request sensor 22, from which a signal line 23 leads to the vehicle movement dynamics controller 10, of a brake cylinder 24, which has the purpose of simulating a pedal stroke and providing fail-safety, and a fluid vessel 25. The fluid vessel 25 is already part of the pressure medium supply. From said vessel 25, a suction line 26 leads to a fluid pump 27 which is driven by a motor 28. The control of the pump 27 and the associated valves are not illustrated. A pressure line 30 leads to the control group 11 on the delivery side of the pump 27 and has a pressure accumulator 29 in the bypass flow. A return line 31 leads back to the fluid vessel 25 from the control group.

The vehicle movement dynamics controller 10 of the brake system is programmed as a processor in such a way that it can also assume the function of a clutch controller since all the measurement variables which are relevant for driving and operating states are fed to it, for example the brake request signal of the driver (line 23) or the rotational speed signals of the wheel speed sensors 34—which are provided again with the corresponding indices in FIG. 2—via the line 33. Further variables are the steering angle, acceleration values, etc. All these signals are generated in the vehicle movement dynamics controller 10 to form control variables for the brake forces or the brake pressures and for the torque which is transmitted by the clutch 6. These control signals 39 are fed to the control group 11 which is designated in its entirety by 11.

The control group 11 is composed of an electronic control group 40 which is of modular design and in which the actuation signals 39 are converted into switching currents which are fed via lines 41 into a valve group 43 which is also of modular design. The modular design consists in the fact that each module is assigned to a wheel, and these are correspondingly provided with indices in FIG. 2. In addition to the 4 modules which are assigned to the individual wheel brakes, a further module 40 for the clutch actuating means is provided as, as it were, a fifth wheel on the vehicle. In many cases, a reserve module, which is normally unused, is already provided in control groups according to the prior art. The object according to the invention may be allocated to this reserve module. In the modular valve group 43, the individual modules are again provided with the corresponding indices, and in each case a hydraulic valve switches, under the control of the control stream 41, the pressurized fluid stream which is conducted from the pressure line 30 to the wheel brake cylinders 12. For this reason, the return line 31 is also connected there.

The invention claimed is:

1. A control system for a vehicle having a plurality of wheels with a hydraulic wheel brake system including a plurality of wheel brake cylinders each associated with a respective one of said plurality of wheels and a drive train system including a hydraulic clutch, said control system comprising:
a master cylinder hydraulically associated with said plurality of wheel brake cylinders and a hydraulic clutch;
a first actuator disposed between said master cylinder and said plurality of wheel brake cylinders;
a second actuator disposed between said master cylinder and said hydraulic clutch; and
a controller selectively actuating said first actuator to enable hydraulic communication between said master cylinder and said plurality of wheel brake cylinders for controlling said plurality of wheel brake cylinders associated with a respective one of the vehicle wheels and selectively actuating said second actuator to enable hydraulic communication between said master cylinder and said hydraulic clutch.

2. The control system of claim 1, wherein said controller actuates said first actuator independently from said second actuator.

3. The control system of claim 2, wherein said first actuator comprises a plurality of first actuators, each of said plurality of first actuators associated with a wheel, and said controller actuates each of said plurality of first actuators independently.

4. The control system of claim 1, wherein said controller communicates electronically with said first actuator and said second actuator.

5. The control system of claim 4, wherein said controller includes a first controller communicating a first actuation signal to said first actuator and a second controller communicating a second actuation signal to said second actuator.

6. The control system of claim 5, wherein said second controller is integral with said first controller.

7. The control system of claim 6, wherein said controller further comprises a first electronic control group capable of generating a first switching current to actuate said first actuator in response to said first actuator signal.

8. The control system of claim 7, wherein said controller further comprises a second electronic control group generating a second switching current to actuate said second actuator in response to said second actuator signal.

9. The control system of claim 8, wherein said first and second electronic control groups are integrated into a modular electronic control group.

10. A vehicle having a plurality of wheels comprising:
a hydraulic brake system having a plurality of brake cylinders each associated with a respective one of said plurality of wheels;
a drive train including a hydraulic clutch;
a master cylinder hydraulically associated with said plurality of brake cylinders and said hydraulic clutch;
a first actuator operably disposed between said master cylinder and said plurality of brake cylinders;

a second actuator operably disposed between said master cylinder and said hydraulic clutch; and a controller selectively actuating said first actuator to enable hydraulic communication between said master cylinder and said plurality of wheel brake cylinders for controlling said plurality of wheel brake cylinders associated with a respective one of the vehicle wheels and selectively actuating said second actuator to enable hydraulic communication between said master cylinder and said hydraulic clutch.

11. The control system of claim 10, wherein said controller actuates said first actuator independently from said second actuator.

12. The control system of claim 11, wherein said first actuator comprises a plurality of first actuators and said control means actuates each of said plurality of first actuators independently.

13. The control system of claim 10, wherein said controller communicates electronically with said first actuator and said second actuator.

14. The control system of claim 13, wherein said controller includes a first controller communicating a first actuation signal to said first actuator and a second controller communicating a second actuation signal to said second actuator.

15. The control system of claim 14, wherein said second controller is integral with said first controller.

16. The control system of claim 15, wherein said controller further comprises a first electronic control group for generating a first switching current to actuate said first actuator in response to said first actuator signal.

17. The control system of claim 16, wherein said controller further comprises a second electronic control group for generating a second switching current to actuate said second actuator in response to said second actuator signal.

18. The control system of claim 17, wherein said first and second electronic control groups are integrated into a modular electronic control group.

19. A motor vehicle having a plurality of wheels comprising:

a brake system having a hydraulic unit with a p pressure medium supply including a plurality of wheel brake cylinders each associated with a respective one of said plurality of wheels and a vehicle movement dynamics controller, an electronic control group for wheel-specific actuation of said wheel brake cylinders, and wheel-specific hydraulic valves combined to form one assembly for activating the individual wheel brake cylinders for controlling the individual wheel brake cylinder associated with a respective one of the vehicle wheels; and a drive system including at least one drive train having a controllable clutch for driving a set of wheels, a clutch controller for activating said controllable clutch as a function of operating variables using a clutch actuator and a hydraulic valve acting on a hydraulic actuator, wherein said clutch controller is integrated into said vehicle movement dynamics controller, and said hydraulic valve for activating said clutch is part of said one assembly and is connected to said pressure medium supply.

20. The motor vehicle as claimed in claim 19 wherein said clutch actuation means is integrated into said electronic control group.

* * * * *